United States Patent [19]

McConnell et al.

[11] 4,072,813

[45] * Feb. 7, 1978

[54] POLY(HIGHER-1-OLEFIN/1-BUTENE) COPOLYMERS AS HOT-MELT PRESSURE-SENSITIVE ADHESIVES

[75] Inventors: Richard L. McConnell, Kingsport; Doyle A. Weemes, Greeneville; Frederick B. Joyner, Kingsport, all of Tenn.

[73] Assignee: Eastman Kodak Company, Rochester, N.Y.

[*] Notice: The portion of the term of this patent subsequent to May 4, 1993, has been disclaimed.

[21] Appl. No.: 657,347

[22] Filed: Feb. 11, 1976

[51] Int. Cl.$^2$ .................. C08F 210/08; C08F 210/14
[52] U.S. Cl. ........................ 526/348.2; 526/348.5; 526/348.6; 526/348.7
[58] Field of Search ............................. 526/350

[56] References Cited

U.S. PATENT DOCUMENTS

| | | | |
|---|---|---|---|
| 3,367,909 | 2/1968 | Hay et al. | 526/350 |
| 3,923,758 | 12/1975 | Carter, Jr. et al. | 526/350 |
| 3,954,697 | 5/1976 | McConnell et al. | 526/350 |

Primary Examiner—Alan Holler
Attorney, Agent, or Firm—Clyde L. Tootle; Daniel B. Reece, III

[57] ABSTRACT

This invention relates to single component, hot-melt, pressure-sensitive adhesives based on 1-butene/higher 1-olefin copolymers or 1-butene/propylene/higher 1-olefin copolymers containing 40–60 mole % of at least one higher 1-olefin. Suitable higher 1-olefins include 1-hexene through 1-decene. These new adhesives can be readily applied to substrates such as tape by means of conventional hot-melt coating equipment and thereby eliminate the solvent pollution problems associated with the application of current solvent-based pressure-sensitive adhesives. Our hot-melt coated tapes generally have pressure-sensitive adhesive properties at least equivalent to those of solvent coated pressure-sensitive tapes.

22 Claims, No Drawings

POLY(HIGHER-1-OLEFIN/1-BUTENE) COPOLYMERS AS HOT-MELT PRESSURE-SENSITIVE ADHESIVES

This invention relates to 1-butene containing copolymers which contain 40 to 60 mole percent of linear 1-olefins having from 6–10 carbon atoms. These copolymers are permanently tacky and are useful as single component hot-melt, pressure-sensitive adhesives.

Pressure-sensitive adhesive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all pressure-sensitive compositions were based on blends of high molecular weight synthetic and natural rubbers with tackifiers. Frequently fillers such as zinc oxide or magnesium oxide are used in PSA formulations which are applied to opaque backing substrates. Typical backing materials include paper, cellophane, plasticized poly(vinyl chloride), polyester film, cellulose acetate film, cloth, foamed polymers (e.g., foamed polystyrene or polypropylene), metal foils, felt, cork and the like. Although PSA compositions have generally been applied to the backings from solvents, there is a strong desire to switch to PSA materials which can be applied as hot melts to eliminate solvent pollution during manufacturing of the products. Also, a non-solvent adhesive is desirable since many solvents are in short supply.

Heretofore it has been recognized that certain prior art copolymers containing 1-hexene or 1-octene were permanently tacky. However, it was not until recently that the critical property requirements for a pressure-sensitive adhesive material were known. Therefore, not all copolymers which are permanently tacky are useful as pressure-sensitive adhesives. For example, poly-1-hexene or 1-hexene copolymers containing minor amounts of propylene or 1-butene (e.g., 5–20 wt. % propylene or 1-butene) are permanently tacky but they have very poor cohesive strength. Therefore, such materials leave a residue when coated polyester tapes are stripped away from steel plates and they fail in the static shear test after less than 100 min. (>1,000 min. required to pass static shear test).

The copolymers described in Canadian Pat. No. 856,337 are made with highly stereospecific catalysts and even those containing equal molar amounts of propylene and 1-hexene contained substantial blocks of each monomer. This "blockiness" prevents these copolymers from retaining a high degree of tack. Therefore, the adhesives basically are hot melt adhesives which require reactivation at elevated temperatures (e.g., 180° F.) for bonding various substrates but are not pressure-sensitive adhesives as defined in the present invention.

Also, crystalline copolymers based on 1-butene, or propylene, with other straight chain olefins having at least three carbon atoms, as described in French Patent No. 1,396,054, have melting points of 80°–125° C., densities of 0.86–0.93, molecular weights of 3,000–8,000, and penetration hardness values of <4 (250 g. weight). While French Patent No. 1,396,054 teaches that these crystalline copolymers can be used as thermoplastic or hot melt adhesives, these crystalline copolymers are not suitable as pressure-sensitive adhesives.

It is also known in the art that certain olefin-copolymers having intrinsic viscosities of 1.5–7.0 and a molecular structure such that 40–75% by weight of the polymer is isotactic material are useful as pressure-sensitive adhesives. The polymers are made at 30° C. using a $R_3Al/TiCl_4$ catalyst. Monomers used include olefins having 2 to 16 carbon atoms. These high molecular weight polymers are applied to the backing material (silicone-coated kraft paper) from heptane solutions containing 16 wt. % polymer. Only qualitative tests (such as touching the adhesive with a finger) are used to determine if the materials have pressure-sensitive properties.

It is apparent, therefore, that it would be an advance in the state of the art to provide a group of selected 1-butene-containing copolymers which are permanently tacky and meet the property requirements for a hot-melt, pressure-sensitive adhesive.

Accordingly, it is one of the objects of this invention to provide new olefin copolymer pressure-sensitive adhesives which can be applied to tape substrates by means of conventional hot-melt applicators.

Another object of the invention is to provide new single-component, hot-melt, pressure-sensitive adhesives which meet the critical requirements necessary for use on general purpose, pressure-sensitive tapes.

A further object of this invention is to provide new single-component, hot-melt, pressure-sensitive adhesives which have good thermal stability at elevated temperatures (e.g., 350° F.).

A still further object of the invention is to provide new single-component, hot-melt, pressure-sensitive adhesive materials which have adequate pressure-sensitive adhesive properties without the addition of other chemical components (e.g., tackifiers, plasticizers, and the like).

One still further object of this invention is to provide new single-component, hot-melt, pressure-sensitive adhesives which do not bleed-through when used on paper backed tapes at use temperatures ranging from 40° to 160° F.

A still further object of the invention is to provide new, solventless, pressure-sensitive adhesives whose application and use eliminates the undesirable environmental effects of solvent-based prior art pressure-sensitive adhesives.

In accordance with this invention, it has been discovered that in order to meet the critical requirements for use as a general purpose, pressure-sensitive adhesive, a material must:

1. Provide a peel strength of at least 2.5 lb./in. — Pressure Sensitive Tape Council (PSTC) Test-1, "Peel Adhesion for Single Coated Tape, 180° Angle".
2. Provide shear adhesion or strength (holding power; static shear resistance) of >1,000 min. when tested with 1 kg. load - PSTC-7.
3. Provide a rolling ball tack value of 2 in. or less - PSTC-6, "Tack, Rolling Ball Method".
4. Have melt viscosity stability at application temperatures such that melt viscosity will change <20% in 100 hr. —J. E. Dickert, P. T. Von Bramer, W. C. Cooper and H. L. Overbay, Journal of the Technical Association of the Pulp and Paper Industry, 51, 64A (1968), and
5. Not leave a residue when coated tapes are peeled from highly polished steel at 73° F. - PSTC-1.

It has been found that only a very limited number of olefin copolymers will meet the above-cited property requirements. Suitable copolymers include 1-butene/higher 1-olefin copolymers and 1-butene/propylene/higher 1-olefin copolymers containing 40-60 mole % of at least one higher 1-olefin. Operable 1-olefin comonomers include 1-hexene, 1-heptene, 1-octene, 1-nonene, and 1-decene. 1-Butene copolymers with <40 mole % comonomer or mixture of comonomers have poor tack and generally poor peel strength while those with >60 mole % comonomer have poor static shear strength and they leave a residue when tapes are peeled from polished steel plates.

In addition to the fact that suitable copolymers must contain 40-60 mole % comonomer, it is essential that the polymer molecule have a particular structure. For example, operable copolymers have no detectable crystallinity by either X-ray or DSC techniques.

It was also found that Tg and density measurements are useful for the characterization of useful copolymers. One suitable method for measuring the Tg (glass transition temperature) of polymers is by Differential Scanning Calorimetry [John Mitchell and Jen Chiu, Anal. Chem. Annual Reviews, 43, 267R (1971); M. J. O'Neill and R. L. Fyans, "Design of Differential Scanning Calorimeters and the Performance of a New System", paper presented at the Eastern Analytical Symposium, New York City, November, 1971]. Density of polymers is generally determined in a density gradient tube (ASTM Method D1505). It has been found that useful copolymers have a density of about <0.86 and a Tg intermediate between that observed for poly-1-butene and that of the higher poly-1-olefins. For example, poly-1-butene has a Tg of about $-25°$ C. and a poly-1-hexene has a Tg of about $-50°$ C. (J. Brandrup and E. H. Immergut, Editors, "Polymer Handbook", Interscience Publishers, New York City, 1966). Useful 1-butene copolymers containing 40-60 mole % higher 1-olefin normally show Tg values of about $-30°$ to $-45°$ C. If the copolymer is too "blocky" (i.e., contains relatively long segments of 1-butene), the copolymer will have a density of >0.86 and it will show a Tg value usually greater than about $-30°$ C.

NMR spectra can also be used to characterize the pressure-sensitive adhesives of this invention. For example, carbon-13 NMR spectra of operable 1-butene/1-hexene copolymers determined in a mixture of o-dichlorobenzene and deuterobenzene as solvent and hexamethyldisiloxane as an internal standard shows peaks at 8.25 and 12.2 ppm. The peak at about 12.2 ppm. is due to the presence of the methyl group in the side groups of the 1-hexene monomer units. The peak at 8.25 ppm. is due to the methyl side groups of the 1-butene monomer units. Copolymers which contain propylene have a multiplicity of peaks centered at about 19.7, 18.9 and 18.1 ppm. Copolymers containing 1-octene have a peak at about 12.2 ppm. These new pressure-sensitive adhesive polymers appear to be multiblock copolymers of higher 1-olefin and 1-butene wherein the 1-butene blocks are partly stereoregular and partly heterotactic segments which are predominantly <20 monomer units long and wherein the higher 1-olefin blocks are incapable of crystallization at least over the use temperature range of $-20°$ to 180° F. We believe that while these copolymers show no detectable crystallinity by X-ray or DSC, they do contain a very low order of poly-1-butene-type crystallinity which accounts for their good cohesive strength in pressure-sensitive adhesive applications.

This structural interpretation of these new pressure-sensitive copolymers is supported by the measurable structure-dependent properties discussed below:

| | |
|---|---|
| Melt viscosity range, cp. at 190° C. | 10,000-75,000 |
| Composition range (higher 1-olefin concentration in mole %) | 40-60 |
| Density range, g./cc. | 0.85-0.86 |
| Tg range, ° C. (glass transition temperature) | $-30$ to $-45$ |
| Tm (crystalline melting point) | no measurable Tm by DSC |

In addition to these structure-dependent properties, these pressure-sensitive adhesives can also be characterized by functional properties which are determined on 1-mil poly(ethylene terephthalate) films coated with 0.75-1.0-mil adhesive:

| | |
|---|---|
| Rolling ball tack, in. | $\leq 2.0$ |
| Static shear strength range, minutes | 1,000-6,500 |
| Peel strength range, lb./in. | 2.5-5.0 |

In preparing these coated tapes, it is critical that the adhesive be applied to the poly(ethylene terephthalate) film at a melt temperature of at least 350° F. The backing material may be preheated if it is polyester, cotton or paper. Heat sensitive backing materials such as cellulose acetate or cellophane are generally not preheated in order to prevent distortion of the backing. The adhesive coating thickness is also critical since commercial coating thickness is generally 1-mil or less. Coating thicknesses of 2-3 mil give erroneous data concerning the utility of the polymer as a pressure-sensitive adhesive.

The type of catalyst and the polymerization conditions required to provide copolymers having the desired structure are quite limited. In general, the best results have been achieved by using catalyst systems which provide poor stereoregulation in the polymerization of propylene or 1-butene. Combinations of Et$_3$Al with AATiCl$_3$ with Al/Ti molar ratios ranging from about 1:1 to 5:1 have been found to be useful. It is also necessary to conduct the polymerization at high temperatures with the preferred temperature range being 150°-160° C. The operable temperature range is 140°-170° C. Temperatures below 140° C. provide too much blocking even when using Et$_3$Al/AATiCl$_3$ catalysts. The molecular weight (melt viscosity) of copolymers made at temperatures in excess of 170° C. is too low to provide adequate pressure-sensitive adhesive properties.

If catalysts which provide highly stereoregular propylene or 1-butene homopolymer are used to copolymerize 1-butene or 1-butene/propylene mixtures with hexene, octene, and decene, multiblock copolymers are formed which contain crystallizable 1-butene segments. Thus, they have inadequate pressure-sensitive adhesive properties. Examples of highly stereospecific catalysts (for the polymerization of propylene) which provide this result include EtAlCl$_2$Bu$_3$N/TiCl$_3$, Et$_3$Al/HPT/TiCl$_3$, and Et$_2$AlCl/HPT/TiCl$_3$ catalysts.

The preferred melt viscosity range for copolymers of this invention include about 13,000 to about 50,000 cp. at 190° C. The operable melt viscosity range is 10,000 to 75,000 cp.

The olefin copolymer pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 {pentaerythritol tetrakis[3,(3,5-di-tert-butyl-4-hydroxyphenyl)propionate]}, Eastman Inhibitor DOPC (dioctadecyl p-cresol), Plastanox 2246 [2,2'-methylene bis(4-methyl-6-tert-butylphenol)], and Ethyl 702 [4,4'-methylene bis-(2,6-di-tert-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastanox 1212 provides good melt viscosity and color stability when the adhesive is maintained in molten form at 350° F. for 8 hours or longer.

The olefin copolymer adhesives of the invention may be used alone or in mixture with other materials such as polyethylene waxes, polypropylene waxes, amorphous polypropylene, amorphous block ethylene/propylene copolymer, paraffin, polyterpenes such as those commercially available and sold as "Nirez 1100", "Nirez 1135", "Piccolyte S10", "Piccolyte 40", "Piccolyte 100", or "Piccolyte 135", hydrocarbon resins such as "Piccopale 85", "Piccopale 100", "Staybelite" or DAC-B hydrocarbon resin and the like.

This invention will be further illustrated by the following examples, although it will be understood that these examples are included merely for purposes of illustration and are not intended to limit the scope of the invention.

EXAMPLE 1

In a nitrogen filled dry box, 200 ml. of dry mineral spirits, 250 ml. (168 g.) of 1-hexene (distilled and dried over sodium ribbon), and 0.37 g. AATiCl$_3$ are placed into a clean, dry 1-liter Parr autoclave, equipped with a stirrer. The autoclave is sealed in the dry box. A clean, dry catalyst injector is loaded with 0.5 g. of Et$_3$Al and 35 ml. of dry mineral spirits in the dry box and then it is connected to the autoclave. The molar ratio of Al to Ti in the catalyst is 2.4 to 1.

After removing the autoclave from the dry box, 120 ml. (72 g.) of liquid 1-butene is pressured into the autoclave. This provides a monomer mixture containing 70 weight % of 1-hexene. The autoclave is heated to 140° C. with stirring. Then the Et$_3$Al solution is injected into the monomer solution to initiate the copolymerization. The copolymerization is exothermic and the temperature of the reaction mixture increases to 150° C. This temperature is maintained for 3 hours and then 200 ml. of isobutyl alcohol is pumped into the autoclave to deactivate the catalyst. The temperature is maintained at 150° C. for an additional 15 minutes. Then the autoclave is cooled to 23° C., vented, and the copolymer is placed in an excess of isobutyl alcohol. The mixture is heated to 105° C., cooled, filtered and the soft, sticky, colorless copolymer is washed with additional isobutyl alcohol to remove catalyst residues. The copolymer is stabilized with 0.25% Irganox 1010 and dried in a vacuum oven at 70°–80° C. The yield of copolymer is 190 g. (79% conversion). It contains 50 mole % 1-hexene as determined by an NMR analysis. This tacky copolymer has a melt viscosity of 26,000 cp. at 190° C., a Tg of −40° C. and a density of 0.85. There is no detectable crystallinity in the sample by either X-ray or DSC analysis.

The copolymer is heated to 177° C. (350° F.) and coated onto poly(ethylene terephthalate) film by means of a hot Doctor blade to give a uniform 1-mil coating. This coated tape performs well as pressure-sensitive tape material. For example, the polymer coating remains permanently tacky and it has good adhesion to paper, steel, polyethylene, poly(ethylene terephthalate) and the like. When the tape is peeled away from a clean stainless steel surface, no polymer residue is left on the steel demonstrating that the copolymer has good cohesive strength. The tape has a rolling ball tack value of 3.5 cm., peel strength (on steel) of 3.5 lb./in. and static shear strength (measured on steel using 1,000 g. weight) of 4,200 min. When a torn page is mended with this tape, the printed matter under the tape is quite legible.

Similarly good results were obtained when the hot-melt, pressure-sensitive copolymer is coated on black paper, crepe paper, 60-lb. Krome-Kote paper, cloth, cellophane, and cellulose acetate film backing materials.

EXAMPLE 2

The procedure of Example 1 is repeated except that 80 ml. of 1-butene and 285 ml. of 1-hexene are used. The tacky, amorphous copolymer is obtained in 78% conversion and it has a melt viscosity of 23,000 cp. at 190° C., and a Tg of −40° C. It contains 59 mole % 1-hexene. Coated poly(ethylene terephthalate) tape has a peel strength of 3.2 lb./in. width, rolling ball tack of 3.6 cm. and static shear strength of 2,200 minutes. Thus, this copolymer also has good pressure-sensitive adhesive properties.

EXAMPLE 3

The procedure of Example 1 is followed, except that 65 ml. of 1-butene and 300 ml., of 1-hexene are used. The conversion of monomer to copolymer is 71%. The copolymer has a melt viscosity of 21,300 cp. at 190° C., and it contains 67 mole % 1-hexene. Coated poly(ethylene terephthalate) tape has a peel strength of 3.1 lb./in. width, rolling ball tack of 4.0 cm. and static shear strength of 600 min. Thus, this copolymer has inadequate static shear strength for general purpose pressure-sensitive tape.

EXAMPLE 4

The procedure of Example 1 is followed, except that 67 ml. of 1-butene, 58 ml. of propylene, and 250 ml. of 1-hexene are used. The conversion of monomer to copolymer is 75%. The copolymer has a melt viscosity of 28,000 cp. at 190° C., and it contains 50 mole percent 1-hexene and about 25 mole % each of 1-butene and propylene. Coated poly(ethylene terephthalate) tape has a peel strength of 4.5 lb./in. width, rolling ball tack of 2.3 cm. and static shear strength of 6500 minutes. This copolymer has excellent pressure-sensitive adhesive properties.

EXAMPLE 5

The procedure of Example 1 is followed except that 160 ml. of 1-butene and 214 ml. of 1-hexene are used. The conversion of monomer to copolymer is 68%. The copolymer has a melt viscosity of 25,000 cp. at 190° C., and it contains 40 mole % 1-hexene. Coated poly(ethylene terephthalate) tape has a peel strength of 3.6 lb./in. width, rolling ball tack of 4.0 cm. and static shear strength of 3100 min.

EXAMPLE 6

The procedure of Example 1 is followed, except that 120 ml. of 1-butene, 125 ml. of 1-hexene, and 155 ml. of 1-octene are used. The conversion of monomer to copolymer is 70%. The copolymer obtained has a melt viscosity of 28,000 cp. at 190° C., and it contains 48 mole % higher 1-olefin. This copolymer has pressure-sensitive properties similar to that of the copolymer described in Example 1.

EXAMPLE 7

The procedure of Example 1 is repeated except that 120 ml. of 1-butene, 155 ml. of 1-octene, and 189 ml. of 1-decene are used. The copolymer (25,000 cp. at 190° C.) is obtained in 71% conversion, and it contains 47 mole % higher 1-olefin. It has a density of 0.85 and a Tg of −39° C. Its pressure-sensitive adhesive properties are similar to those of the copolymer described in Example 1.

EXAMPLE 8

The procedure of Example 1 is repeated except that 120 ml. of 1-butene, 125 ml. of 1-hexene and 140 ml. of 1-heptene are used. The copolymer is obtained in 70% conversion and contains about 50 mole % higher 1-olefin. Its physical properties and pressure-sensitive adhesive properties are similar to those of the copolymer described in Example 1.

EXAMPLE 9

The procedure of Example 1 is repeated except that 120 ml. of 1-butene and 311 ml. of 1-octene are used. The copolymer is obtained in 78% convesion and it contains about 52 mole % 1-octene. Its physical properties and pressure sensitive adhesive properties are similar to that of the copolymer described in Example 1.

EXAMPLE 10

The procedure of Example 1 is repeated except that 120 ml. of 1-butene, 125 ml. of 1-hexene, 78 ml. of 1-octene and 95 ml. of 1-decene are used. The copolymer is obtained in 80% conversion, has a melt viscosity of 26,000 cp., and contains 51 mole % higher 1-olefin. Its physical properties and pressure sensitive properties are similar to that of the copolymer described in Example 1.

The olefin copolymers of this invention are useful in pressure sensitive adhesives. As pressure sensitive adhesives they find utility in preparing tapes by applying the adhesive by conventional hot melt procedures to a substrate such as a film which can be prepared from conventional film materials such as a polyester, for example. The pressure sensitive adhesive can be applied onto labels, decals, floor tile as well as wall coverings, such as wall paper, and shelf coverings, such as shelf paper.

The invention has been described in considerable detail with particular reference to certain preferred embodiments thereof, but it will be understood that variations and modifications can be effected within the spirit and scope of the invention.

We claim:

1. A hot melt, pressure sensitive adhesive comprising an amorphous 1-butene/higher 1-olefin copolymer or amorphous 1-butene/propylene/higher 1-olefin copolymer containing 40 to 60 mole percent higher 1-olefin hving a melt viscosity range at 190° C. of 10,000 cp. to 75,000 cp., a density of 0.85 to 0.86, a glass transition temperature of −30° to −45° C., and having no melting point measurable by Differential Scanning Calorimetry, wherein said higher 1-olefin is at least one member of the group consisting of 1-hexene, 1-heptene, 1-octene, 1-nonene and 1-decene.

2. A hot melt, pressure sensitive adhesive according to claim 1 wherein said amorphous 1-butene/higher 1-olefin copolymer is a 1-butene/1-hexene copolymer.

3. A hot melt, pressure sensitive adhesive according to claim 1 wherein said amorphous 1-butene/higher 1-olefin copolymer is a 1-butene/1-hexene/1-heptene copolymer.

4. A hot melt, pressure sensitive adhesive according to claim 1 wherein said amorphous 1-butene/higher 1-olefin copolymer is a 1-butene/1-octene/1-decene copolymer.

5. A hot melt, pressure sensitive adhesive according to claim 1 wherein said amorphous 1-butene/higher 1-olefin copolymer is a 1-butene/1-hexene/1-nonene copolymer.

6. A hot melt, pressure sensitive adhesive according to claim 1 wherein said amorphous 1-butene/higher 1-olefin copolymer is a 1-butene/1-hexene/1-octene/1-decene copolymer.

7. A hot melt pressure sensitive adhesive according to claim 1 wherein said amorphous 1-butene/higher 1-olefin copolymer is a 1-butene/propylene/1-heptene copolymer.

8. A hot melt pressure sensitive adhesive according to claim 1 wherein said amorphous 1-butene/higher 1-olefin copolymer is a 1-butene/1-pentene/1-heptene copolymer.

9. A hot melt pressure sensitive adhesive according to claim 1 wherein said amorphous 1-butene/higher 1-olefin copolymer is a 1-butene/propylene/1-hexene copolymer.

10. A hot melt pressure sensitive adhesive according to claim 1 wherein said amorphous 1-butene/higher 1-olefin copolymer is a 1-butene/propylene/1-octene copolymer.

11. A hot melt pressure sensitive adhesive according to claim 1 wherein said amorphous 1-ubtene/higher 1-olefin copolymer is a 1-butene/propylene/1-decene copolymer.

12. A hot melt, pressure sensitive adhesive comprising an amorphous 1-butene/higher 1-olefin copolymer or amorphous 1-butene/propylene/higher 1-olefin copolymer containing 40 to 60 mole percent higher 1-olefin having a melt viscosity range at 190° C. of 13,000 cp. to 50,000 cp., a density of 0.85 to 0.86, a glass transition temperature of −30 to −45° C., and having no melting point measurable by Differential Scanning Calorimetry, wherein said higher 1-olefin is at least one member of the group consisting of 1-hexene, 1-heptene, 1-octene, 1-nonene and 1-decene.

13. A hot melt, pressure sensitive adhesive according to claim 12 wherein said amorphous 1-butene/higher 1-olefin copolymer is a 1-butene/1-hexene copolymer.

14. A hot melt, pressure sensitive adhesive according to claim 12 wherein said amorphous 1-butene/higher 1-olefin copolymer is a 1-butene/1-hexene/1-heptene copolymer.

15. A hot melt, pressure sensitive adhesive according to claim 12 wherein said amorphous 1-butene/higher 1-olefin copolymer is a 1-butene/1-octene/1-decene copolymer.

16. A hot melt, pressure sensitive adhesive according to claim 12 wherein said amorphous 1-butene/higher 1-olefin copolymer is a 1-butene/1-hexene/1-nonene copolymer.

17. A hot melt, pressure sensitive adhesive according to claim 12 wherein said amorphous 1-butene/higher 1-olefin copolymer is a 1-butene/1-hexene/1-octene/1-decene copolymer.

18. A hot melt pressure sensitive adhesive according to claim 12 wherein said amorphous 1-butene/higher 1-olefin copolymer is a 1-butene/propylene/1-heptene copolymer.

19. A hot melt pressure sensitive adhesive according to claim 12 wherein said amorphous 1-butene/higher 1-olefin copolymer is a 1-butene/1-pentene/1-heptene copolymer.

20. A hot melt pressure sensitive adhesive according to claim 12 wherein said amorphous 1-butene/higher 1-olefin copolymer is a 1-butene/propylene/1-hexene copolymer.

21. A hot melt pressure sensitive adhesive according to claim 12 wherein said amorphous 1-butene/higher 1-olefin copolymer is a 1-butene/propylene/1-octene copolymer.

22. A hot melt pressure sensitive adhesive according to claim 12 wherein said amorphous 1-butene/higher 1-olefin copolymer is a 1-butene/propylene/1-decene copolymer.

* * * * *